US006180213B1

(12) United States Patent
Kuroki et al.

(10) Patent No.: US 6,180,213 B1
(45) Date of Patent: Jan. 30, 2001

(54) HEAT SENSITIVE PLANOGRAPHIC PRINTING PLATE, ITS MANUFACTURING METHOD AND IMAGE FORMING METHOD EMPLOYING THE SAME

(75) Inventors: Takaaki Kuroki; Yasuo Kojima; Saburou Hiraoka, all of Hino; Takeo Akiyama, deceased, late of Hino, all of (JP), by Yasuo Akiyama, legal representative

(73) Assignee: Konica Corporation, Tokyo (JP)

( * ) Notice: Under 35 U.S.C. 154(b), the term of this patent shall be extended for 0 days.

(21) Appl. No.: 09/152,540

(22) Filed: Sep. 14, 1998

(30) Foreign Application Priority Data

Sep. 22, 1997 (JP) ..................................................... 9-275188

(51) Int. Cl.$^{7}$ .............................. B32B 27/14; B32B 3/00

(52) U.S. Cl. ...................... 428/195; 428/478.2; 428/500; 428/503; 428/913; 525/330.3

(58) Field of Search ..................................... 428/500, 195, 428/523, 478.2, 913, 503; 430/203, 330; 525/330.3

(56) References Cited

U.S. PATENT DOCUMENTS

| | | | | |
|---|---|---|---|---|
| 3,283,708 | | 11/1966 | Yackel | 101/149.2 |
| 3,392,024 | * | 7/1968 | Burness | 96/111 |
| 3,793,025 | * | 2/1974 | Vrancken et al. | 96/36 |
| 3,871,900 | * | 3/1975 | Hayashi et al. | 117/36.8 |
| 4,012,538 | * | 3/1977 | Miyamoto et al. | 427/145 |
| 4,034,183 | | 7/1977 | Uhlig | 219/122 |
| 4,202,566 | * | 5/1980 | Kosche | 282/27.5 |
| 4,234,212 | * | 11/1980 | Kato et al. | 282/27.5 |
| 4,547,456 | * | 10/1985 | Kojima et al. | 430/330 |
| 5,041,353 | * | 8/1991 | Takeda | 430/138 |
| 5,079,212 | * | 1/1992 | Ishida et al. | 503/226 |
| 5,087,603 | * | 2/1992 | Izubayashi et al. | 503/226 |
| 5,264,316 | * | 11/1993 | Yamada et al. | 430/138 |
| 5,275,932 | * | 1/1994 | Weigel et al. | 430/617 |
| 5,437,952 | * | 8/1995 | Hirai et al. | 430/83 |

FOREIGN PATENT DOCUMENTS

| | | |
|---|---|---|
| 0 720 057 A1 | 7/1996 | (EP) . |
| 0 747 230 A2 | 12/1996 | (EP) . |
| 0 779 161 A1 | 6/1997 | (EP) . |
| 0 800 927 A1 | 10/1997 | (EP) . |
| 0 882 583 A1 | 12/1998 | (EP) . |
| 2 264 671 | 10/1975 | (FR) . |

OTHER PUBLICATIONS

Research Disclosure, "A Lithographic Printing Plate", No. 333, Jan. 1, 1992, p. 2, XP000281114.

* cited by examiner

*Primary Examiner*—William Krynski
*Assistant Examiner*—B. Shewareged
(74) *Attorney, Agent, or Firm*—Frishauf, Holtz, Goodman, Langer & Chick, P.C.

(57) ABSTRACT

Disclosed is a heat sensitive planographic printing plate material comprising a support and provided thereon, a heat sensitive layer containing 10 to 98 weight % of at least one hydrophilic resin selected from the group consisting of gelatin, polyvinyl alcohol and carboxymethyl cellulose, and 2 to 50 weight % of a cross-linking agent cross-linking the hydrophilic resin.

15 Claims, No Drawings

HEAT SENSITIVE PLANOGRAPHIC PRINTING PLATE, ITS MANUFACTURING METHOD AND IMAGE FORMING METHOD EMPLOYING THE SAME

FIELD OF THE INVENTION

The present invention relates to a planographic printing plate material which does not require liquid development, and particularly to a planographic printing plate material providing a planographic printing plate preventing image portions on the plate from dissolving during printing.

BACKGROUND OF THE INVENTION

A printing plate is ordinarily prepared by exposing to light a presensitized planographic printing plate and developing the exposed plate with liquid developer. This process, however, produces waste liquid developer which must be discarded, resulting in environmental problems.

Recently, a method (dry plate-making process) for making a printing plate without employing liquid developer has been studied, and various methods have been proposed for the dry plate-making process, For example, there is proposed a method of preparing a planographic printing plate according to a transfer method, however, this method has a problem of producing image defects. Further, there is proposed a method preparing a planographic printing plate according to an ablation method, however, this method has a problem in that the ablated scatters and soils the surroundings, and further a specific development machine is required for forming an image in a closed system.

To the contrary, physical property change type planographic printing plate material is preferable which can form an image employing oleophile-hydrophile property change, since this material makes it possible to prepare a planographic printing plate without liquid development.

Various physical property change type planographic printing plate materials have been proposed. For example, in Japanese Patent O.P.I. Publication No. 62-164049 is disclosed a planographic printing plate material comprising a hydrophilic support, and provided thereon, a recording layer containing a block isocyanate and an active hydrogen-containing resin capable of reacting with an isocyanate, wherein the support or the recording layer contains a light-heat converting compound. This technique provides improved durability at exposed portions, since isocyanate produced by heat application reacts with the resin, however, this comprises a developing step of dissolving unexposed portions with a liquid developer. When a planographic printing plate prepared from this material without liquid development after exposure is used, it produces dissolution of non-exposed portions and stains on dampening rollers during printing, resulting in adverse effects on the printing properties.

A method employing capsules was proposed, but the method has a problem of resolving power resulting from the capsule size.

In Japanese Patent O.P.I. Publication No. 51-63704 is disclosed a method of preparing a planographic printing plate, imagewise exposing to laser a planographic printing plate material without any further treatment after exposure, which has, on a support, a hydrophilic layer containing dyes and a non-light sensitive compound such as PVP, PVA, casein, dextrin, gum arabic, HEC, PEG, polyacrylic acid, or PVPA. However, this method is not necessary satisfactory, since it has problems of low sensitivity and high noise.

In U.S. Pat. No. 4,081,572 is disclosed a physical property change type planographic printing plate material comprising a support, and provided thereon, a hydrophilic layer containing a specific hydrophilic polymer, in which the hydrophilic layer is made hydrophobic by imagewise energy exposure. In this case, change from the hydrophilic to hydrophobic layer at image portions is realized by decarboxylation of the hydrophilic polymer, and therefore, strength of the image portions and the non-image portions is not sufficient, resulting in lowering of printing durability.

In view of the above, the present invention has been made. The present invention provides a planographic printing plate prepared by a dry plate-making process, and provides a planographic printing plate material which is inexpensive, and gives improved sensitivity, S/N, and strength at image portions and non-image portions, and high resolving power.

SUMMARY OF THE INVENTION

A first object of the invention is to provide a heat sensitive planographic printing plate material, which can provide a planographic printing plate through dry plate-making process, without requiring discarding treatment of a waste solution, and through a shortened planographic printing plate preparing process, and an image forming method employing the material.

A second object of the invention is to provide a heat sensitive planographic printing plate material with high sensitivity which can provide a planographic printing plate without stop stains, and with high strength at image portions and non-image portions, excellent printing durability, high water tolerance, and high resolving power, and an image forming method employing the material.

DETAILED DESCRIPTION OF THE INVENTION

The above objects can be attained by the following:

1. A heat sensitive planographic printing plate material comprising a support and provided thereon, a heat sensitive layer, wherein the heat sensitive layer contains at least one hydrophilic resin selected from the group consisting of gelatin, polyvinyl alcohol and carboxymethyl cellulose in an amount of 10 to 98 weight %, and a cross-linking agent in an amount of 2 to 50 weight %.
2. The heat sensitive planographic printing plate material of item 1 above, wherein the heat sensitive layer further contains a light-heat converting agent.
3. The heat sensitive planographic printing plate material of item 2 above, wherein the light-heat converting agent is a near-infrared absorbent.
4. The heat sensitive planographic printing plate material of item 3 above, wherein the near-infrared absorbent is selected from the group consisting of carbon black, a cyanine dye, and a polymethine dye.
5. The heat sensitive planographic printing plate material of item 1 above, further comprising a light-heat converting layer containing a light-heat converting agent.
6. The heat sensitive planographic printing plate material of item 1, 2, 3, 4 or 5 above, wherein the cross-linking agent is at least one selected from the group consisting of an amino resin, an amino compound, an aziridine compound, and aldehydes.
7. The heat sensitive planographic printing plate material of item 1, 2, 3, 4, 5 or 6 above, wherein the heat sensitive layer further contains a reaction accelerating agent.

8. The heat sensitive planographic printing plate material of item 1 above, wherein the heat sensitive layer has a dry thickness of 0.01 to 15 $\mu$m.
9. The heat sensitive planographic printing plate material of item 1, 2, 3, 4, 5, 6, 7 or 8 above, wherein after the material is immersed in 25° C. water for 1 hour, the dissolution amount of the heat sensitive layer is 10 weight % or less based on the weight of heat sensitive layer before the immersion.
10. The heat sensitive planographic printing plate material of item 1, 2, 3, 4, 5, 6, 7 or 8 above, wherein the material is subjected to heat treatment so that a dissolution amount of the heat sensitive layer after immersed in 25° C. water for 1 hour is 10 weight % or less based on the weight of heat sensitive layer before the immersion.
11. A method of manufacturing the heat sensitive planographic printing plate material of item 1, 2, 3, 4, 5, 6, 7 or 8 above, the method comprising the steps of coating on a support a heat sensitive layer containing at least one hydrophilic resin selected from the group consisting of gelatin, polyvinyl alcohol and carboxymethyl cellulose, in an amount of 10 to 98 weight %, and a cross-linking agent in amount of 2 to 50 weight %, which cross-links the hydrophilic resin; and then drying the coated heat sensitive layer by entirely heating so that a dissolution amount of the heat sensitive layer after immersed in 25° C. water for 1 hour is 10 weight % or less based on the weight of heat sensitive layer before the immersion.
12. A method of forming an image, the method comprising the steps of heating the heat sensitive planographic printing plate material of item 1, 2, 3, 4, 5, 6, 7 or 8 above, so that a dissolution amount of the heat sensitive layer after immersed in 25° C. water for 1 hour is 10 weight % or less based on the weight of heat sensitive layer before the immersion; and then imagewise exposing the heated material to energy.
13. A method of forming an image, the method comprising the step of imagewise exposing to energy the heat sensitive planographic printing plate material of item 9 or 10 above.
14. The method of item 12 or 13, wherein the imagewise exposing is carried out employing an infrared laser with high output.

The present invention will be detailed below.

The hydrophilic resin used in the heat sensitive layer in the invention will be explained below.

The hydrophilic resin has a group capable of forming a chemical bond on reaction with a cross-linking agent. The group includes a hydroxy group, a carboxy group, a group having a (secondary or tertiary) amine, an amino group, an amido group, a carbamoyl group, a sulfonic acid group, a phosphonic acid group, and a mercapto group. Among these groups, a hydroxy group, a carboxy group, a group having a (secondary or tertiary) amine, or an amino group is preferable.

The hydrophilic resin includes polyvinyl alcohol, polysaccharide, polyvinyl pyrrolidone, polyethylene glycol, gelatin, glue, casein, hydroxyethyl cellulose, carboxymethyl cellulose, methyl cellulose, hydroxyethyl starch, sucrose octaacetate, ammonium alginate, sodium alginate, polyvinyl amine, polyallyl amine, polystyrene sulfonic acid, polyacrylic acid, a water soluble polyamide and a maleic anhydride copolymer.

Among these, gelatin, polyvinyl alcohol, or carboxymethyl cellulose is preferable, and gelatin, or polyvinyl alcohol is more preferable.

The hydrophilic resin used in the invention is gelatin, polyvinyl alcohol, or carboxymethyl cellulose.

Gelatin, polyvinyl alcohol, or carboxymethyl cellulose (hereinafter referred to also as the hydrophilic resin in the invention) will be explained below.

Polyvinyl alcohol includes, besides polyvinyl alcohols having various polymerization degrees, copolyvinyl alcohols; random copolyvinyl alcohols with a polyvinyl alcohol skeleton of 50 mol% or more including an anion modified polyvinyl alcohol modified with an anion such as a carboxy group or a sulfo group, a cation modified polyvinyl alcohol modified with a cation such as an amino group or an ammonium group, a silanol modified polyvinyl alcohol, an alkoxyl modified polyvinyl alcohol, an epoxy modified polyvinyl alcohol, and a thiol modified polyvinyl alcohol; a modified polyvinyl alcohol in which only the molecular end is modified with an anion, a cation, thiol, silanol, alkoxyl or epoxy; a block copolyvinyl alcohol in which a water soluble monomer such as acrylic acid or acrylamide is incorporated; a grafted copolyvinyl alcohol grafted with a silanol group; and a copolyvinyl alcohol in which a reactive group such as silanol, acetoacetyl, thiol or epoxy is incorporated.

Polyvinyl alcohol has a saponification degree of preferably 70 mol% or more, more preferably 85 mol% or more, and still more preferably 95 mol% or more. Heat treatment of polyvinyl alcohols having a high saponification degree can vary their crystallinity, and can provide water resistance.

The term "saponification degree" herein referred to represents an amount (mol%) in which vinyl acetate component of polyvinyl acetate is saponified (hydrolyzed) to vinyl alcohol. That is, the "saponification degree" represents x (mol%) in the following formula:

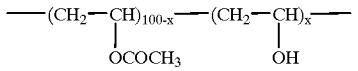

In the copolyvinyl alcohols, the monomer to be copolymerized includes the following monomers:

(1) a monomer having an aromatic hydroxy group, for example, o-hydroxystyrene, p-hydroxystyrene, m-hydroxystyrene, o-hydroxyphenylacrylate, p-hydroxyphenylacrylate, m-hydroxyphenylacrylate,
(2) a monomer having an aliphatic hydroxy group, for example, 2-hydroxyethylacrylate, 2-hydroxyethylmethacrylate, N-methylolacrylamide, N-methylolmethacrylamide, 4-hydroxybutylacrylate, 4-hydroxybutylmethacrylate, 5-hydroxypentylacrylate, 5-hydroxypentylmethacrylate, 6-hydroxyhexylacrylate, 6-hydroxyhexylmethacrylate, N-(2-hydroxyethyl)acrylamide, N-(2-hydroxyethyl) methacrylamide, hydroxyethylvinyl ether,
(3) a monomer having an aminosulfonyl group, for example, m-aminosulfonylphenyl methacrylate, p-aminosulfonylphenyl methacrylate, m-aminosulfonylphenyl acrylate, p-aminosulfonylphenyl acrylate, N-(p-aminosulfonylphenyl) methacrylamide, N-(p-aminosulfonylphenyl)acrylamide,
(4) a monomer having a sulfonamido group, for example, N-(p-toluenesulfonyl)acrylamide, N-(p-toluenesulfonyl)-methacrylamide,
(5) an $\alpha,\beta$-unsaturated carboxylic acid, for example, acrylic acid, methacrylic acid, maleic acid, maleic anhydride, itaconic acid, itaconic anhydride, N-(p-toluenesulfonyl)acrylamide, N-(p-toluenesulfonyl)-methacrylamide, (6) a substituted or unsubstituted alkylacylate, for example, methylacrylate, ethylacrylate, propylacrylate, butylacrylate, amylacrylate, hexylacrylate, heptylacrylate, octylacrylate, nonylacrylate, decylacrylate, undecylacrylate, dodecylacrylate, benzylacrylate, cyclohexylacrylate, 2-chloroethylacrylate, N,N-dimethylaminoethylacrylate, glycidylacrylate, (7) a substituted or unsubstituted alkylmethacylate, for example, methylmethacrylate, ethylmethacrylate, propylmethacrylate, butylmethacrylate, amylmethacrylate, hexylmethacrylate, heptylmethacrylate, octylmethacrylate, nonylmethacrylate, decylmethacrylate, undecylmethacrylate, dodecylmethacrylate, benzylmethacrylate, cyclohexylmethacrylate, 2-chloroethylmethacrylate, N,N-dimethylaminoethylmethacrylate, glycidylmethacrylate, methacrylamide, (8) an acrylamide or methacrylamide, for example, acrylamide, methacrylamide, N-ethylacrylamide, N-hexylacrylamide, N-cyclohexylacrylamide, N-phenylacrylamide, N-nitrophenylacrylamide, N-ethyl-N-phenylacrylamide, N-4-hydroxyphenylacrylamide, N-4-hydroxyphenylmethacrylamide, (9) a monomer having a fluorinated alkyl group, for example, trifluoroethylacrylate, trifluoroethylmrthacrylate, tetrafluoropropylacrylate, tetrafluoropropylmethacrylate, hexafluoropropylmethacrylate, octafluoropentylacrylate, octafluoropentylmethacrylate, heptadecafluorodecylacrylate, heptadecafluorodecylmethacrylate, N-butyl-N-(2-acryloxyethyl)heptadecafluorooctylsulfonamide,

(10) a vinyl ether, for example, ethylvinyl ether, 2-chloroethylvinyl ether, propylvinyl ether, butylvinyl ether, octylvinyl ether, phenylvinyl ether,

(11) a vinyl ester, for example, vinyl acetate, vinyl chroloacetate, vinyl butate, vinyl benzoate,

(12) a styrene, for example, styrene, methylstyrene, chloromethystyrene,

(13) a vinyl ketone, for example, methylvinyl ketone, ethylvinyl ketone, propylvinyl ketone, phenylvinyl ketone,

(14) an olefin, for example, ethylene, propylene, isobutylene, butadiene, isoprene,

(15) N-vinylpyrrolidone, N-vinylcarbazole, N-vinylpyridine,

(16) a monomer having a cyano group, for example, tacrylonitrile, metacrylonitrile, 2-pentenenitrile, 2-methyl-3-butene nitrile, 2-cyanoethylacrylate, o-cyanostyrene, m-cyanostyrene, p-cyanostyrene,

(17) a monomer having an amino group, for example, N,N-diethylaminoethylmethacrylate, N,N-dimethylaminoethylacrylate, N,N-dimethylaminoethylmethacrylate, polybutadiene urethaneacrylate, N,N-dimethylaminopropylacrylamide, N,N-dimethylacrylamide, acryloylmorpholine, N-isopropylacrylamide, N,N-diethylacrylamide.

Polyvinyl alcohol used in the invention is preferably a polyvinyl alcohol in which a reactive group or an anionic group is incorporated, and more preferably a polyvinyl alcohol in which a reactive group is incorporated. The reactive group includes a silanol group, an acetoacetyl group, a thiol group or an epoxy group. The reactive group is preferably a silanol group, an acetoacetyl group, or a thiol group.

Polymerization degree of the polyvinyl alcohol in the invention is 150 to 5,000, preferably 200 to 3,000, and more preferably 300 to 2,000.

One or more kinds of the above described polyvinyl alcohols can be used.

In addition to the polyvinyl alcohol in the invention, other polymers or one or more kinds of releasing agents can be used in combination, or two or more kinds of other polymers and two or more kinds of releasing agents can be used in combination. The other polymers include a natural polymer such as starch, modified starch, casein, glue, gelatin, gum arabic, sodium alginate, or pectin; a semi synthetic polymer such as carboxymethyl cellulose, methyl cellulose or viscose; a synthetic polymer such as polyacrylamide, polyethylene imine, sodium polyacrylate, polyethylene oxide, or polyvinyl pyrrolidone; and compounds disclosed in Japanese Patent O.P.I. Publication No. 4-176688. The releasing agents include compounds disclosed in Japanese Patent O.P.I. Publication No. 4-186354.

Further, an anti-static agent or a surface active agent can be used in order to improve physical properties of the polyvinyl alcohols. The typical examples thereof include compounds disclosed in Japanese Patent O.P.I. Publication No. 4-184442, one or more kinds of which can be used in combination.

Gelatin includes alkali process gelatin, acid process gelatin or modified gelatin (as disclosed in Japanese Patent Publication Nos. 38-4854 and 40-12237, and British Patent No. 2,525,753), and one or more kinds thereof can be used singly or in combination. Lime processed gelatin, acid processed gelatin, hydrolyzed gelatin, or enzyme processed gelatin as described in Bull. Soc. Sci. Photo. Japan, No. 16, p.30 (1966) can be also used.

Carboxymethyl cellulose includes carboxymethyl cellulose and its salt such as its sodium, calcium, potassium, aluminum, magnesium, or ammonium salt. Among these, carboxymethyl cellulose, sodium carboxymethyl cellulose or ammonium carboxymethyl cellulose is preferable, and ammonium carboxymethyl cellulose is more preferable. These are water soluble, but are preferable in that after coated and dried on a support to form a layer, they lower water solubility of the layer.

The heat sensitive layer in the invention contains the hydrophilic polymer in the invention in an amount of 10 to 98 weight %. The hydrophilic polymer content of less than 10 weight % results in lowering of layer strength or lowering of reaction rate due to cross-linking site shortage. The hydrophilic polymer content exceeding 98 weight % results in lowering of reaction rate due to shortage of cross-linking agents. The hydrophilic polymer content of the heat sensitive layer is preferably 20 to 97 weight %, and preferably 30 to 96 weight %.

In the invention, one or more of same kinds of hydrophilic resins may be used, and two or more of different kinds of hydrophilic resins may be used.

The cross-linking agent used in the invention will be explained below.

A conventional cross-linking agent can be used, as long as the agent can cross-link the hydrophilic resin in the invention. The cross-linking agent includes an amino resin, an aziridine compound, an amino compound, aldehydes, an isocyanate compound, a carboxylic acid, an acid anhydride, a halide, a phenol-formaldehyde resin, and a compound having two or more epoxy groups.

The preferable cross-linking agent is an amino resin, an amino compound, an aziridine compound, or aldehydes. The cross-linking agent used in the invention may be a low molecular weight compound, an oligomer or a polymer.

The amino resin includes a condensate resin of melamine, benzoguanamine, or urea with aldehydes or ketones, and the example thereof includes a melamine-formaldehyde resin, a urea-formaldehyde resin, and methylolmelamines. These amino resins are useful for the hydrophilic resin in the invention having a hydroxy group, a carboxy group or a mercapto group.

The halide includes dichlorotriazines disclosed in U.S. Pat. Nos. 3,325,287, 3,288,775 and 3,549,377 and Belgian Patent No. 6,622,226. These halides are useful for the hydrophilic resin in the invention having a hydroxy group, or an amino group.

The amino compound or aziridine copmound includes aziridine copmounds disclosed in U.S. Pat. No. 3,392,024, ethyleneimine compounds disclosed in U.S. Pat. No. 3,549, 377 and the following compounds:

TETA $H_2N(CH_2)_2NH(CH_2)_2NH_2$

MTETA

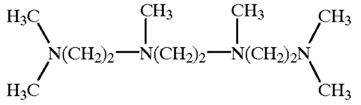

DMP-30

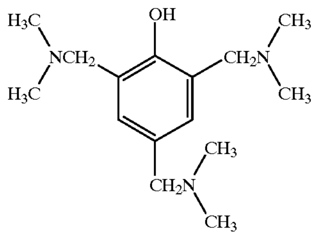

DABCO

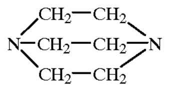

HMTA

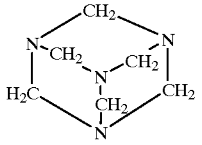

DI-PYP

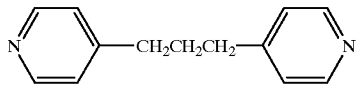

DI-PIP

di-4-picolol-amine

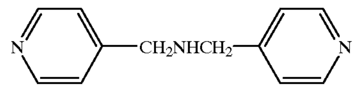

-continued phenylMAPO

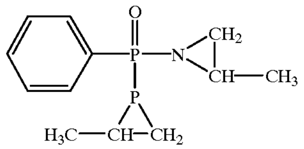

MAPO

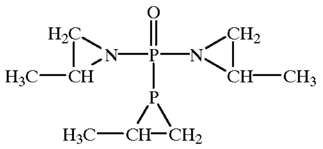

HMTA

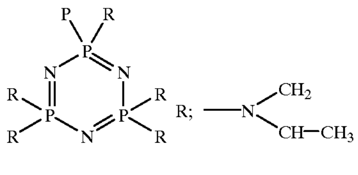

The amino compound or aziridine copmound is useful for the hydrophilic resin in the invention having a hydroxy group, or a carboxy group.

The isocyanate compound includes an isocyanate (a blocked isocyanate) having a protective group. The example of the isocyanate compound includes 2,4-tolylenediisocyanate, 2,6-tolylenediisocyanate, 4,4'-diphenylmethane diisocyanate, 1,5-naphthalene diisocyanate, tolidinediisocyanate, 1,6-hexamethylenediisocyanate, isophoronediisocyanate, xylenediisocyanate, triphenylmethanediisocyanate, and bicycloheptanediisocyanate.

The isocyanate compound is useful for the hydrophilic resin in the invention having a hydroxy group, a carboxy group, a mercapto group or an amino group.

The aldehydes include formaldehyde, glyoxal, and dialdehydes disclosed in U.S. Pat. Nos. 3,291,624 and 3,232, 764, French Patent No. 1,543,694 and British Patent No. 1,270,578.

The aldehydes are useful for the hydrophilic resin in the invention having a hydroxy group.

When gelatin is used as the hydrophilic resin in the invention, as the cross-linking agent, chromium salts (chrome alum, chromium acetate), aldehydes (formaldehyde, glyoxal, glutaraldehyde), an N-methylol compound (dimethylolurea, methyloldimethylhydantoin), dioxane derivatives (2,3-dihydroxydioxane), active vinyl compounds (1,3,5-triacroyl-hexahydro-s-triazine, bis (vinylsulfonyl)methylether, N,N'-methylenebis-[β-(vinylsulfonyl)propionamide]), active halogen compounds (2,4-dichloro-6-hydroxy-s-triazine), mucohalogen acids (mucochloric acid, phenoxymucochloric acid), isooxazoles, starch dialdehyde, 2-chloro-6-hydroxy-triazinylated gelatin, isocyanates and carboxy activating cross-linking agents can be used. The cross-linking agents may be used singly or in combination.

The heat sensitive layer in the invention contains, in an amount of 2 to 50 weight %, the cross-linking agent, which cross-links the hydrophilic resin in the invention. The cross-linking agent content of less than 2 weight % results in lowering of layer strength or lowering of reaction rate due to cross-linking site shortage. The cross-linking agent content exceeding 50 weight % cannot complete cross-linking reaction, resulting in undesirable large fluctuation in performance during storage of the heat sensitive planographic printing plate material.

In the invention, one or more of same kinds of cross-linking agents may be used, and two or more of different kinds of cross-linking agents may be used.

The heat sensitive layer in the invention preferably contains a reaction accelerating agent accelerating cross-linking reaction of the hydrophilic resin with the cross-linking agent. The reaction accelerating agent accelerates cross-linking reaction, produces high cross-linking linkage. necessary to provide high printing durability, and can shorten the plate making process time.

The reaction accelerating agent includes a conventional reaction accelerating agent. The example thereof includes an ammonium compound such as ammonium chloride, ammonium acetate, ammonium sulfate, ammonium nitrate, ammonium phosphate, ammonium secondary phosphate, ammonium thiocyanate, or ammonium sulfamate; an organic amine salt such as dimethylaniline hydrochloride, pyridine hydrochloride, picoline monochloroacetic acid, Catalyst AC (produced by Monsanto Co., Ltd.), Catanit A (produced by Nitto Kagaku Co., Ltd.), or Sumirez Accelerator ACX-P (produced by Sumitomo Kagaku Co., Ltd.); and an inorganic salt such as stannic chloride, ferric chloride, magnesium chloride, zinc chloride, or zinc sulfate.

A precursor of the reaction accelerating agent is advantageously used. The precursor is transformed into a reaction accelerating agent on heating, and the reaction accelerating agent is produced in accordance with an image.

The precursor is, for example, a precursor releasing an acid on heating. The precursor includes a sulfonium compound, especially a benzylsulfonium compound disclosed in British Patent No. 612,065, European Patent No. 615233, and U.S. Pat. No. 5,326,677; an inorganic nitrate (for example, $Mg(NO_3)_2.6H_2O$, ammonium nitrate) or an organic nitrate (for example, guanidinium nitrate, pyridinium nitrate) disclosed in European Patent No. 462,763, WO 81/1755, and U.S. Pat. No. 4,370,401; a compound releasing a sulfonic acid, for example, 3-sulfolenones or 2,5-dihydrothio-thiophene-1,1-dioxides disclosed in U.S. Pat. No. 5,312,721; a thermally decomposable compound disclosed in British Patent No. 1,204,495, a co-crystallization adduct compound of amine with a volatile organic acid disclosed in U.S. Pat. No. 3,669, 747; aralkylcyanoforms disclosed in U.S. Pat. No. 3,166,583; a thermo acid disclosed in European Patent No. 159,725 and West German Patent No. 351,576; a square acid generating compound disclosed in U.S. Pat. No. 5,278,031; and an acid generating compound disclosed in U.S. Pat. Nos. 5,225,314 and 5,227,277 and Research-Disclosure No. 11511 (November, 1973).

The heat sensitive layer in the invention can contain various fine particles as fillers. Organic or inorganic fine particles can be used as preferable fillers.

The organic fine particles include fine particles of Polymethyl methacrylate (PMMA), polystyrene, polyethylene, polypropylene, or another radical polymerization polymers and fine particles of condensation polymers such as polyesters and polycarbonates.

Any method can be used as a method of preparing the organic fine particles. The method includes a method according to polymerization of monomers in a dispersion medium such as an emulsion polymerization or a suspension polymerization, a method of dissolving a polymer in a good solvent (optionally while heating) and then cooling, or adding a poor solvent to produce polymer precipitates (fine particles can be easily obtained when shear force is applied at precipitation), a method of pulverizing and dispersing a polymer in a solvent through a sand mill or a ball mill, and a method of dispersing a polymer in dry state, followed by classifying.

The inorganic fine particles include fine particles of zinc oxide, titanium oxide, barium sulfate, calcium carbonate, and silica (silicon oxide).

The inorganic fine particles can be prepared according to a method of pulverizing and dispersing inorganic compounds in a solvent through a dispersion means such as a sand mill or a ball mill.

When organic fine particles or inorganic fine particles are prepared by pulverizing and dispersing in a solvent through a dispersion means such as a sand mill or a ball mill, an appropriate dispersion agent is preferably added.

The inorganic super fine particles can be used in the invention. The inorganic super fine particles include those of silica (colloidal silica), alumina or hydrated alumina (alumina sol, colloidal alumina, cationic aluminum oxide or its hydrate, pseudo-boehmite), surface treated cationic colloidal silica, aluminum silicate, magnesium silicate, magnesium carbonate, titanium dioxide, and zinc oxide. These super fine particles can be used singly or in combination.

The inorganic super fine particles can be used together with inorganic fine particles. As the inorganic fine particles, conventional inorganic fine particles can be used, as long as the object of the invention is not jeopardized. The inorganic fine particles include light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, synthetic non-crystalline silica, alminum hydroxide, lithopone, zeolite, hydrated halloysite, magnesium hydroxide, and synthetic mica. Among these inorganic fine particles, porous inorganic fine particles are preferable, and the porous inorganic fine particles include porous synthetic non-crystalline silica, porous calcium carbonate, and porous alumina. The porous synthetic non-crystalline silica, in which the total pore volume is large, is especially preferable.

The organic fine particles of a styrene resin, an acryl resin, polyethylene, microcapsules, a urea resin, a melamine resin and a fluorine-containing resin can be used together with, or in place for, the above described inorganic fine particles.

The primary order particle size of the inorganic super fine particles is preferably 100 nm or less, and more preferably 50 nm or less. Less particle size is preferable, since it provides uniform layer surface. The inorganic super fine particles are ordinarily dispersed in colloid form in a solvent, maintaining a primary order particle size.

The thickness of the heat sensitive layer in the invention is preferably 30 $\mu$m or less, more preferably 0.01 to 15 $\mu$m, and most preferably 0.1 to 3 $\mu$m.

The heat sensitive layer of the heat sensitive planographic printing plate material of the invention changes from hydrophile to hydrophobic by heating. Therefore, imagewise heating of the heat sensitive planographic printing plate material provides a planographic printing plate.

When the heat sensitive planographic printing plate material, comprising a layer containing a light-heat converting agent, is exposed to laser, light is converted to heat at exposed portions, whereby the layer at exposed portions changes from hydrophile to hydrophobic. An image forming method employing laser can provide a highly precise writing, and therefore, the heat sensitive planographic printing plate material preferably comprises a layer containing a light-heat converting agent.

The heat sensitive planographic printing plate material comprising a light-heat converting agent can provide not only writing with a thermal head but also highly precise writing with laser with high energy.

The light-heat converting agent may be contained in any layer, as long as heat produced by light-heat conversion can transfer to the heat sensitive layer of the heat sensitive planographic printing plate material. For example, the light-heat converting agent may be contained in the heat sensitive layer, in a layer (hereinafter referred to also as a light-heat converting layer) other than the heat sensitive layer, or in the support. In the heat sensitive planographic printing plate material of the invention, the light-heat converting layer may be provided on the heat sensitive layer or between the heat sensitive layer and the support, but is preferably provided between the heat sensitive layer and the support. The light-heat converting agent content of the heat sensitive layer is preferably 2 to 50% by weight, and more preferably 5 to 30% by weight.

The light-heat converting agent is preferably a compound which absorbs light and effectively converts to heat, although different due to a light source used. For example, when a semi-conductor laser emitting near-infrared light is used as a light source, a near-infrared absorbent having absorption in the near-infrared light region is preferably used. The near-infrared absorbent includes an inorganic compound such as carbon black, an organic compound such as a cyanine dye, a polymethine dye, an azulenium dye, a squalenium dye, a thiopyrylium dye, a naphthoquinone dye or an anthraquinone dye, and an inorganic metal complex of phthalocyanine, azo or thioamide type. Exemplarily, the near-infrared absorbent includes compounds disclosed in Japanese Patent O.P.I. Publication Nos. 63-139191, 64-33547, 1-160683, 1-280750, 1-293342, 2-2074, 3-26593, 3-30991, 3-34891, 3-36093, 3-36094, 3-36095, 3-42281, 3-97589 and 3-103476. These compounds can be used singly or in combination of two or more kinds thereof.

Among these near-infrared absorbents, carbon black, a cyanine dye, and a polymethine dye are preferable.

The light-heat converting agent can be used in a form of an evaporation layer. The evaporation layer includes an evaporation layer of carbon black, an evaporation layer of metal black such as gold, silver, aluminum, chrome, nickel, antimony, tellurium, bismuth, or selenium disclosed in Japanese Patent O.P.I. Publication No. 52-20842, and an evaporation layer containing colloid silver.

When the light-heat converting agent is contained in a layer other than the heat sensitive layer, the agent is preferably contained with a binder. As the binder are preferably used a resin having high Tg and high heat conductivity. Such a binder includes conventional heat resistant resins such as polymethylmethacrylate, polycarbonate, polystyrene, ethylcellulose, nitrocellulose, polyvinyl alcohol, polyvinyl chloride, polyamide, polyimide, polyether imide, polysulfone, polyether sulfone, and aramide.

A water soluble polymer can be also used as the binder. The water soluble polymer is preferable because it has high heat resistance while irradiating light, and restrains layer scatter when excessive heat is applied. When the water soluble polymer is used, it is preferable that the light-heat converting agent is water solubilyzed by incorporation of a sulfo group to the agent or dispersed in water.

Gelatin or PVA is preferable in providing reduced flocculation of the light-heat cnverting agent, stable coating of the light-heat converting layer, and a heat sensitive material with excellent storage stability, and in minimizing turbidity or sensitivity decrease due to flocculation of the light-heat converting agent.

The thickness of the light-heat converting layer is preferably 0.1 to 3 μm, and more preferably 0.2 to 1.0 μm. The light-heat converting agent content of the light-heat converting layer can ordinarily be determined in such a manner that the layer gives an optical density of preferably 0.3 to 3.0, and more preferably 0.7 to 2.5 to light wavelength emitted from a light source used.

When the light-heat converting layer, provided between the support and the heat sensitive layer, is poor in adhesion to the support, an adhesive layer can be provided between the support and the light-heat converting layer.

Such an adhesive layer is preferably a layer with improved heat conductive efficiency and reduced transfer irregularity.

The heat sensitive planographic printing plate material of the invention is prepared by coating the above described layer on a support.

The support is not specifically limited, and a support of various kinds of material, various layer constitutions or various size is optionally used according to its usage.

The support includes a paper sheet such as paper, a coat paper or a synthetic paper (for example, a polypropylene sheet, a polystyrene sheet or their lamination sheet), a polyvinyl chloride sheet, an ABS resin sheet, a polyethylene terephthalate film, a polybutylene terephthalate film, a polyethylene naphthalate film, a polyarylate film, a polycarbonate film, polyether ketone film, a polysulfone film, a polyimide film, a polyethylene film or a polypropylene film or their lamination film, a metal film or sheet, a ceramic film or sheet, a metal plate of aluminum, stainless steel, chromium or nickel, a metal foil laminated resin coated paper, and a metal deposited resin coated paper.

The thickness of the support is preferably from 50 to 500 μm, and more preferably from 100 to 400 μm.

When the support surface is hydrophobic, the surface is subjected to hydrophilization treatment. The hydrophilization treatment includes sulfuric acid treatment, oxygen plasma etching treatment, corona discharge treatment and a water soluble resin layer coating.

The heat sensitive planographic printing plate material of the invention is prepared by coating, on a support, a coating solution containing the hydrophilic resin and the cross-linking agent cross-linking the hydrophilic resin, and optionally containing a light-heat converting agent or another additive according to a conventional coating method and then drying to form a heat sensitive layer. When the light-heat converting agent is present at a layer other than the heat sensitive layer, a coating solution containing the light-heat converting agent was coated and dried in the same manner as above to form a light-heat converting agent containing layer.

The drying temperature is 30 to 100° C., and preferably 30 to 80° C., and more preferably 30 to 70° C. The drying time is preferably 30 seconds to 10 minutes, and more preferably 1 to 5 minutes.

In the heat sensitive planographic printing plate material of the invention, a dissolution amount of the heat sensitive layer after immersed in 25° C. water for 1 hour is preferably 0 to 10 weight %, more preferably 0 to 8 weight %, and still more preferably 0 to 5 weight %, based on the weight of heat sensitive layer before the immersion.

It is preferable in the invention the heat sensitive layer formed after drying is entirely heated so that a dissolution amount of the heat sensitive layer after immersed in 25° C. water for 1 hour is as described above. Temperature of the entire heating is preferably 30 to 80° C., and more preferably 35 to 70° C., and still more preferably 40 to 60° C. Time of the entire heating varies due to amount or kind of the cross-linking agent, or the presence or absence of the reaction accelerating agent, but the time is determined so that a dissolution amount of the heat sensitive layer after immersed in 25° C. water for 1 hour is 10 weight % or less based on the weight of heat sensitive layer before the immersion.

The entire heating can be carried out, immediately after the drying, or immediately before making a planographic printing plate employing the heat sensitive planographic printing plate material of the invention.

In the invention, the dissolution amount of the heat sensitive layer after immersed in 25° C. water for 1 hour is obtained according to the following formula:

$$\text{Dissolution amount } (\%)=(A-B)\times 100/(A-S)$$

wherein A represents weight of heat sensitive planographic printing plate material before immersed in 25° C. water for 1 hour, and B represents weight of heat sensitive planographic printing plate material after immersed in 25° C. water for 1 hour, and S represents weight of the support of the heat sensitive planographic printing plate material.

In the above formula, (A–B) represents difference between the heat sensitive layer weight before and after the immersion, and (A–S) represents weight of heat sensitive layer before the immersion.

The above A, B, and S are measured according to the following method:

(Measurement of A, B and S)

Heat sensitive planographic printing plate material is cut into 100 (10×10 $cm^2$) square centimeters, and stored at ordinary temperature for 3 hours in a desiccator charged with a drying agent. Then, weight A of the resulting material is measured. The resulting material is immersed in 25° C. pure water for 1 hour. Then, the material is taken from the water, dried at 60° C. for 1 hour, and further stored at ordinary temperature for 3 hours in a desiccator charged with a drying agent. Then, weight B of the resulting material is measured. Thereafter, the heat sensitive layer of the resulting material is removed by an aqueous 5 weight % sodium hydroxide solution to obtain a support, washed with water, and dried. Then, weight S of the resulting support is measured.

According to the difference between the weight of heat sensitive planographic printing plate material before and after the immersion, strength of heat sensitive layer can be evaluated, and the layer strength at non-image portions can be evaluated in the swelling state of the layer approximated to that in printing. The evaluation is carried out according to the following:

(Evaluation of Heat Sensitive Layer Strength)

The heat sensitive planographic printing plate material is cut into 100 (10×10 $cm^2$) square centimeters, and stored at ordinary temperature for 3 hours in a desiccator charged with a drying agent. Then, the weight W1 of the resulting material is measured. The resulting material is further immersed in 25° C. pure water for 1 hour. The material is taken from the water, and high pressure and shearing force as described below are applied in the swell state employing DX-700 (produced by Tokyo Laminex Co., Ltd.) equipped with a JK wiper (produced by Kuresia Co., Ltd.).

| | |
|---|---|
| Temperature | 25° C. |
| Pressure | 2 kg/cm |
| Rate | 30 mm/sec |

After that, the material is dried at 60° C. for 1 hour, and further stored at ordinary temperature for 3 hours in a desiccator charged with a drying agent. Then, the weight W2 of the resulting material is measured.

The difference between the weight of heat sensitive planographic printing plate material before and after the immersion is obtained by subtracting W1 from W2.

The heat sensitive planographic printing plate material of the invention preferably contains two kinds of cross-linking agents which are different in reactivity from each other. For example, a combination use of a urea resin and a melamine resin is preferable, wherein the urea resin is added in an amount enough to enhance layer strength, and image portions are formed by heating to accelerate reaction of a melamine resin, and destroying the polar groups of the hydrophilic resin.

It is preferable that the heat sensitive planographic printing plate material of the invention contains two or more kinds of cross-linking agents and a reaction accelerating agent, which accelerates cross-linking reaction of one of the cross-linking agents. In such a heat sensitive planographic printing plate material, reaction at low temperature is reduced, and the other cross-linking agents can be effectuated on heating.

In the heat sensitive planographic printing plate material of the invention, various kinds of back coat layers can be provided on the surface of the support opposite the heat sensitive layer, in order to minimize curl of the material, and to prevent adherence of the heat sensitive layer surface to the opposite surface after exposure.

An image forming method in the invention includes (a) directly imagewise heating the heat sensitive layer of the heat sensitive planographic printing plate material with a thermal head, and (b) heating the heat sensitive layer by imagewise exposing it to high energy light, in which light absorbed by the layer is converted to heat.

The image forming method of directly writing with a thermal head is suitable in forming an image with a low resolving power image or a line image with low cost. The image forming method of imagewise exposing to high energy light is suitable in forming an image with a high resolving power image or a dot image as in commercial printing, since it can provide a highly precise writing.

The light source for imagewise exposure includes, for example, a laser, an emission diode, a xenon flush lamp, a halogen lamp, a carbon arc light, a metal halide lamp, a tungsten lamp, a high pressure mercury lamp, and a non-electrode light source.

In order to imagewise exposing to high energy light the heat sensitive planographic printing plate material, the exposure is carried out through a mask material having an image pattern made of a light shielding material employing a xenon lamp, a halogen lamp, a carbon arc light, a metal halide lamp, a tungsten lamp, a high pressure mercury lamp, or a non-electrode light source.

When an array light such as an emission diode array is used or exposure using a halogen lamp, a metal halide lamp or a tungsten lamp is controlled using an optical shutter material such as liquid crystal or PLZT, a digital exposure according to an image signal is possible and preferable. In this case, direct writing is possible without using any mask material.

When a laser is used for exposure, which can be condensed in the beam form, scanning exposure according to an image can be carried out, and direct writing is possible without using any mask material. When the laser is employed for imagewise exposure, a highly dissolved image can be obtained, since it is easy to condense its exposure spot in minute size. As the laser, argon laser, He-Ne gas laser, YAG laser or semi-conductor laser is preferably used.

Among these lasers, YAG laser and semi-conductor laser are preferable, in that they are light source with high energy suitable for the heat sensitive planographic printing plate material of the invention, relatively inexpensive, and compact.

A laser scanning method by means of a laser beam includes a method of scanning on an outer surface of a cylinder, a method of scanning on an inner surface of a cylinder and a method of scanning on a plane. In the method of scanning on an outer surface of a cylinder, laser beam exposure is conducted while a drum around which a recording material is wound is rotated, in which main scanning is represented by the rotation of the drum, while sub-scanning is represented by the movement of the laser beam. In the method of scanning on an inner surface of a cylinder, a recording material is fixed on the inner surface of a drum, a laser beam is emitted from the inside, and main scanning is carried out in the circumferential direction by rotating a part of or an entire part of an optical system, while sub-scanning is carried out in the axial direction by moving straight a part of or an entire part of the optical system in parallel with a shaft of the drum. In the method of scanning on a plane, main scanning by means of a laser beam is carried out through a combination of a polygon mirror, a galvano mirror and an F θ lens, and sub-scanning is carried out by moving a recording medium. The method of scanning on an outer surface of a cylinder and the method of scanning on an inner surface of a cylinder are more suitable for high density recording because they make it easy to enhance a precision of an optical system.

The image forming process employing the heat sensitive planographic printing plate material of the invention is characterized in that imagewise exposure is all that is processed, not followed by conventional liquid development which removes the non-image portion layer with a liquid developer.

The heat sensitive planographic printing plate material is subjected to imagewise exposure by a specific light source to obtain a planographic printing plate, and printing can be carried out mounting the resulting planographic printing plate on a plate cylinder of a press. Further, it is also possible that the heat sensitive planographic printing plate material is mounted on the plate cylinder of the press, and subjected to imagewise exposure on the plate cylinder to obtain a planographic printing plate, followed by printing.

EXAMPLES

The invention will be detailed in the following examples, but the invention is not limited thereto.

Example 1

The surface of a 175 μm thick polyethylene terephthalate (PET) film on a heat sensitive layer side was corona discharged with energy of 15 ($W/m^2 \cdot min$) to obtain a support.

(Preparation of heat sensitive planographic printing plate material sample 1)

The following heat sensitive layer composition 1 was coated on the support above and dried at 50° C. for 3 minutes to have a heat sensitive layer with a dry thickness of 3.0 μm. The resulting material was entirely heated at 35° C. for additional 3 hours. Thus, heat sensitive planographic printing plate material sample 1 was obtained.

| (Heat sensitive layer composition 1) | |
|---|---|
| Gelatin (as a binder) | 70.0 weight parts |
| Formaldehyde | 10.0 weight parts |
| Infrared absorbent (CY-17, made by Nihon Kayaku Co., Ltd.) | 20.0 weight parts |

Pure water is added to have a solid component concentration of 8 weight %.

(Preparation of Heat Sensitive Planographic Printing Plate Material Sample 2)

The following heat sensitive layer composition 2 was coated on the support above and dried at 50° C. for 3 minutes to have a heat sensitive layer with a dry thickness of 3.0 μm. The resulting material was entirely heated at 35° C. for additional 3 hours. Thus, heat sensitive planographic printing plate material sample 2 was obtained.

| (Heat sensitive layer composition 2) | |
|---|---|
| Gelatin (as a binder) | 70.0 weight parts |
| Formaldehyde | 6.0 weight parts |
| Melamine resin (80% by weight aqueous solution, Sumirez Resin 613, made by Sumitomo Kagaku Co., Ltd.) | 6.0 weight parts |
| Infrared absorbent (CY-17, made by Nihon Kayaku Co., Ltd.) | 20.0 weight parts |

Pure water is added to have a solid component concentration of 8 weight %.

(Preparation of Heat Sensitive Planographic Printing Plate Material Sample 3)

The following heat sensitive layer composition 3 was coated on the support above and dried at 50° C. for 3 minutes to have a heat sensitive layer with a dry thickness of 3.0 μm. The resulting material was entirely heated at 55° C. for additional 2 days. Thus, heat sensitive planographic printing plate material sample 3 was obtained.

| (Heat sensitive layer composition 3) | |
|---|---|
| Polyvinyl Alcohol (*KL-05: made by Nihon Gosei Kagaku Co., Ltd.) | 70.0 weight parts |
| Melamine resin (80% by weight aqueous solution, Sumirez Resin 613, made by Sumitomo Kagaku Co., Ltd.) | 12.0 weight parts |
| Organic amine salt (35% by weight aqueous solution, Sumirez Accelerator ACX-P, made by Sumitomo Kagaku Co., Ltd.) | 5.0 weight parts |
| Carbon black (SD9020: made by Dainihon Ink Kogyo Co., Ltd.) | 20.0 weight parts |

*KL-05: polymerization degree: 500, saponification degree: 78.5–82.0

Pure water is added to have a solid component concentration of 8 weight %.

(Preparation of Heat Sensitive Planographic Printing Plate Material Sample 4)

The following heat sensitive layer composition 4 was coated on the support above and dried at 50° C. for 3 minutes to have a heat sensitive layer with a dry thickness of 3.0 μm. The resulting material was entirely heated at 55° C. for additional 30 minutes. Thus, heat sensitive planographic printing plate material sample 4 was obtained.

| (Heat sensitive layer composition 4) | |
|---|---|
| Polyvinyl Alcohol (**Z-100: made by Nihon Gosei Kagaku Co., Ltd.) | 70.0 weight parts |
| Melamine resin (80% by weight aqueous solution, Sumirez Resin 613, made by Sumitomo Kagaku Co., Ltd.) | 12.0 weight parts |

-continued

| (Heat sensitive layer composition 4) | |
|---|---|
| Organic amine salt (35% by weight aqueous solution, Sumirez Accelerator ACX-P, made by Sumitomo Kagaku Co., Ltd.) | 5.0 weight parts |
| Carbon black (SD9020: made by Dainihon Ink Kogyo Co., Ltd.) | 20.0 weight parts |

*Z-100: polymerization degree: 300, saponification degree: 95–97, acetoacetyl incorporated.

Pure water is added to have a solid component concentration of 8 weight %.

(Preparation of Heat sensitive Planographic Printing Plate Material Sample 5)

The following heat sensitive layer composition 5 was coated on the support above and dried at 50° C. for 3 minutes to have a heat sensitive layer with a dry thickness of 3.0 μm. The resulting material was entirely heated at 55° C. for additional 30 minutes. Thus, heat sensitive planographic printing plate material sample 5 was obtained.

| (Heat sensitive layer composition 5) | |
|---|---|
| Polyvinyl Alcohol (Z-100: made by Nihon Gosei Kagaku Co., Ltd.) | 70.0 weight parts |
| Melamine resin (80% by weight aqueous solution, Sumirez Resin 613, made by Sumitomo Kagaku Co., Ltd.) | 12.0 weight parts |
| Organic amine salt (35% by weight aqueous solution, Sumirez Accelerator ACX-P, made by Sumitomo Kagaku Co., Ltd.) | 5.0 weight parts |
| Carbon black (SD9020: made by Dainihon Ink Kogyo Co., Ltd.) | 20.0 weight parts |
| Silica (Sylycia 445: made by Fuji Silycia Kagaku Co., Ltd.) | 39.0 weight parts |

Pure water is added to have a solid component concentration of 8 weight %.

(Preparation of Heat Sensitive Planographic Printing Plate Material (Comparative) Sample 6)

The following heat sensitive layer composition 6 was coated on the support above and dried at 50° C. for 3 minutes to have a heat sensitive layer with a dry thickness of 3.0 μm. The resulting material was entirely heated at 55° C. for additional 2 days. Thus, heat sensitive planographic printing plate material sample 6 was obtained.

| (Heat sensitive layer composition 6) | |
|---|---|
| Polyvinyl Alcohol (KL-05: made by Nihon Gosei Kagaku Co., Ltd.) | 70.0 weight parts |
| Melamine resin (80% by weight aqueous solution, Sumirez Resin 613, made by Sumitomo Kagaku Co., Ltd.) | 1.2 weight parts |
| Organic amine salt (35% by weight aqueous solution, Sumirez Accelerator ACX-P, made by Sumitomo Kagaku Co., Ltd.) | 0.5 weight parts |
| Carbon black (SD9020: made by Dainihon Ink Kogyo Co., Ltd.) | 20.0 weight parts |

Pure water is added to have a solid component concentration of 8 weight %.

(Preparation of Heat sensitive Planographic Printing Plate Material (Comparative) Sample 7)

The following heat sensitive layer composition 7 was coated on the support above and dried at 50° C. for 3 minutes to have a heat sensitive layer with a dry thickness of 3.0 μm. The resulting material was entirely heated at 55° C. for additional 2 days. Thus, heat sensitive planographic printing plate material sample 7 was obtained.

| (Heat sensitive layer composition 7) | |
|---|---|
| Polyvinyl Alcohol (KL-05: made by Nihon Gosei Kagaku Co., Ltd.) | 30.0 weight parts |
| Melamine resin (80% by weight aqueous solution, Sumirez Resin 613, made by Sumitomo Kagaku Co., Ltd.) | 72.0 weight parts |
| Organic amine salt (35% by weight aqueous solution, Sumirez Accelerator ACX-P, made by Sumitomo Kagaku Co., Ltd.) | 20.0 weight parts |
| Carbon black (SD9020: made by Dainihon Ink Kogyo Co., Ltd.) | 20.0 weight parts |

Pure water is added to have a solid component concentration of 8 weight %.

(Preparation of Heat Sensitive Planographic Printing Plate Material (Comparative) Sample 8)

The following heat sensitive layer composition 8 was coated on the support above and dried at 70° C. for 3 minutes to have a heat sensitive layer with a dry thickness of 3.0 μm. Thus, heat sensitive planographic printing plate material sample 8 was obtained.

| (Heat sensitive layer composition 8) | |
|---|---|
| Isobutylene-maleic anhydride copolymer ethanol solution (solid content of 20 weight %) | 100 weight parts |
| Ethanol dispersion solution of the following block isocyanate (solid content of 30 weight %) | 35 weight parts |
| Carbon black (SD9020: made by Dainihon Ink Kogyo Co., Ltd.) | 5 weight parts |

(Preparation of Block Isocyanate)

In a three necked flask with a stirrer, a thermometer, and a condenser, 125 g of 2-methylimidazole and 125 g of 1,6-hexamethylene diisocyanate were placed, and the resulting mixture was heated to 75° C., and reacted until free isocyanate was not observed. Thus, block isocyanate was obtained.

(Preparation of Planographic Printing Plate)

The heat sensitive planographic printing plate material samples 1 through 8 prepared above were imagewise exposed to a semiconductor laser (having a wavelength of 830 nm and an output of 500 mW). Thus, planographic printing plates 1 through 8 were obtained.

The laser light spot diameter was 20 μm at $1/e^2$ of the peak intensity. The resolving degree was 2,000 DPI in both the main and the sub scanning directions.

The resulting samples were evaluated for sensitivity, small dot reproduction, and printing durability according to the following methods. The results are shown in Table 1.

(Sensitivity)

Sensitivity was represented in terms of exposure energy ($mj/cm^2$) necessary for a solid image at image portions formed after exposure to uniformly receive development ink (PI-2 produced by Fuji Photo Film Co. Ltd.).

(Resolving Power)

When exposure was carried out under the above conditions, exposure energy ($mj/cm^2$) necessary for a solid image at image portions formed after exposure to uniformly receive development ink (PI-2 produced by Fuji Photo Film Co. Ltd.) was determined. When the samples were exposed at that exposure energy, reproduction of an image with a screen line number of 175 was observed through a 100 power magnifying glass, and the image range (%) uniformly reproduced was determined.

(Printing Durability)

When exposure was carried out under the above conditions, exposure energy (mj/$cm^2$) necessary for a solid image at image portions formed after exposure to uniformly receive ink (Hyplus M Magenta made by Toyo Ink Manufacturing Co.) for printing was determined. When the samples were exposed at that exposure energy, printing plate having an image with a screen line number of 175 was prepared. Printing was conducted on a printing machine (Heidel GTO) employing the resulting printing plate, wherein a coated paper, printing ink (Hyplus M Magenta made by Toyo Ink Manufacturing Co.) and dampening water (SEU-3, 2.5% aqueous solution made by Konica Corp.) were used. Printing durability was evaluated by continuing printing until the moment when defective inking occurs on a solid image of a print or stains occur on non-image portions of a print and by counting the number of prints printed during the period up to that moment.

(Stains During Printing)

Printing was carried out under the above described conditions, and stains at non-image portions were observed when the dampening water supplying amount was gradually reduced during printing.

(Storage Stability)

Each of the above obtained samples was stored at 55° C. and 50% RH for five days in a thermostat, and then exposed in the same manner as in the above evaluation of printing durability to prepare a printing plate. Printing was conducted on a printing machine (Heidel GTO) employing the resulting printing plate, wherein a coated paper, printing ink (Hyplus M Magenta made by Toyo Ink Manufacturing Co.) and dampening water (SEU-3, 2.5% aqueous solution, made by Konica Corporation) were used. Stains at non-image portions of the thousandth print were evaluated according to the following criteria:

(Evaluation Criteria)

A: No stains observed

B: Slight stains observed

C: Stains observed

TABLE 1

| Sample No | Sensitivity (mj/$cm^2$) | Resolving power (%) | Printing durability (number of prints) | Stains | Storage stability | |
|---|---|---|---|---|---|---|
| 1 | 600 | 2–98 | 3000 | No | B | Invention |
| 2 | 600 | 2–98 | 3000 | No | A | Invention |
| 3 | 400 | 2–98 | 2000 | No | B | Invention |
| 4 | 350 | 2–98 | 5000 | No | B | Invention |
| 5 | 350 | 2–98 | 6000 | No | A | Invention |
| 6 | 1500 | 10–90 | 50 | No | A | Comparative |
| 7 | 250 | 2–70 | 6000 | Yes | C | Comparative |
| 8 | 800 | * | ** | ** | C | Comparative |

* The entire surface of the sample received ink.

** The entire surface of the sample received printing ink, and printing could not be carried out.

As is apparent from Table 1, the inventive samples provide superior results in sensitivity, resolving power, printing durability or storage stability as compared with comparative samples.

What is claimed is:

1. A heat sensitive planographic printing plate material comprising a support and provided thereon, a heat sensitive layer, wherein the heat sensitive layer contains a hydrophilic resin in an amount of 30 to 96 weight %, and a cross-linking agent in an amount of 2 to 50 weight %, wherein the hydrophilic resin is selected from the group consisting of gelatin, polyvinyl alcohol and carboxymethyl cellulose.

2. The heat sensitive planographic printing plate material of claim 1, wherein the heat sensitive layer further contains a light-heat converting agent.

3. The heat sensitive planographic printing plate material of claim 2, wherein said light-heat converting agent is a near-infrared absorbent.

4. The heat sensitive planographic printing plate material of claim 3, wherein said near-infrared absorbent is selected from the group consisting of carbon black, a cyanine dye, and a polymethine dye.

5. The heat sensitive planographic printing plate material of claim 1, wherein the cross-linking agent is at least one selected from the group consisting of an amino resin, an amino compound, an aziridine compound, and aldehydes.

6. The heat sensitive planographic printing plate material of claim 1, wherein the heat sensitive layer further contains a reaction accelerating agent.

7. The heat sensitive planographic printing plate material of claim 1, wherein the heat sensitive layer has a dry thickness of 0.01 to 15 $\mu$m.

8. The heat sensitive planographic printing plate material of claim 1, wherein after the material is immersed in 25° C. water for 1 hour, the dissolution amount of the heat sensitive layer is 10 weight % or less based on the weight of heat sensitive layer before the immersion.

9. A heat sensitive planographic printing plate material comprising a support and provided thereon, a heat sensitive layer, wherein the heat sensitive layer contains polyvinyl alcohol having a saponification degree of 70 mol % or more, and a cross-linking agent in an amount of 2 to 50 weight %.

10. The heat sensitive planographic printing plate material of claim 9, wherein the heat sensitive layer further contains a light-heat converting agent.

11. The heat sensitive planographic printing plate material of claim 10, wherein said light-heat converting agent is a near-infrared absorbent.

12. The heat sensitive planographic printing plate material of claim 11, wherein said near-infrared absorbent is selected from the group consisting of carbon black, a cyanine dye, and a polymethine dye.

13. The heat sensitive planographic printing plate material of claim 9, wherein the cross-linking agent is at least one selected from the group consisting of an amino resin, an amino compound, an aziridine compound, and aldehydes.

14. The heat sensitive planographic printing plate material of claim 9, wherein the heat sensitive layer further contains a reaction accelerating agent.

15. The heat sensitive planographic printing plate material of claim 9, wherein the heat sensitive layer has a dry thickness of 0.01 to 15 $\mu$m.

* * * * *